(12) United States Patent
Toishi et al.

(10) Patent No.: US 8,134,765 B2
(45) Date of Patent: Mar. 13, 2012

(54) HOLOGRAM RECORDING AND RECONSTRUCTION APPARATUS

(75) Inventors: Mitsuru Toishi, Tokyo (JP); Tomiji Tanaka, Saitama (JP); Atsushi Fukumoto, Kanagawa (JP); Kenjiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 761 days.

(21) Appl. No.: 11/683,249

(22) Filed: Mar. 7, 2007

(65) Prior Publication Data

US 2007/0258118 A1 Nov. 8, 2007

(30) Foreign Application Priority Data

Mar. 8, 2006 (JP) .............................. P2006-062295

(51) Int. Cl.
*G03H 1/22* (2006.01)
(52) U.S. Cl. .......................................... 359/32; 359/30
(58) Field of Classification Search .................. None
See application file for complete search history.

(56) References Cited

U.S. PATENT DOCUMENTS

| | | | | |
|---|---|---|---|---|
| 5,920,532 | A * | 7/1999 | Yagi et al. | 369/53.22 |
| 6,785,028 | B1 * | 8/2004 | Atsuumi et al. | 359/207.11 |
| 2006/0077853 | A1 * | 4/2006 | Matsumoto et al. | 369/103 |
| 2006/0171006 | A1 * | 8/2006 | Fukumoto et al. | 359/10 |

FOREIGN PATENT DOCUMENTS

| | | |
|---|---|---|
| JP | 2002-032001 | 1/2002 |
| JP | 2004-226821 | 8/2004 |
| JP | 2007-200394 | 8/2007 |

OTHER PUBLICATIONS

Toishi et al., "Temperature tolerance improvement with wavelength tuning laser source in holographic data storage," Technical Digest of Optical Data Storage/International Symposium, 2005.
Nikkei Electronics, pp. 106-114, Jan. 17, 2005.
Japanese Office Action issued Apr. 5, 2011, corresponding to Japanese Appln. No. 2006-062295.

* cited by examiner

*Primary Examiner* — Stephone Allen
*Assistant Examiner* — Derek S Chapel
(74) *Attorney, Agent, or Firm* — K&L Gates LLP

(57) ABSTRACT

A hologram recording and reconstruction apparatus records and reconstructs a hologram in a recording layer of a holographic recording medium using a signal light beam and a reference light beam. The apparatus includes an objective lens, a spatial light modulator on which a reference light beam pattern for generating a reference light beam is displayed, a temperature sensor for detecting the temperature of the holographic recording medium, and a control unit for controlling the spatial light modulator to reduce a reference light beam pattern so that the reference light beam passes through the more inner portion of the objective lens or enlarge the reference light beam pattern so that the reference light beam passes through the more outer portion of the objective lens in accordance with the temperature.

6 Claims, 10 Drawing Sheets

HOLOGRAM RECORDING AND RECONSTRUCTION APPARATUS

CROSS REFERENCES TO RELATED APPLICATIONS

The present application claims priority to Japanese Patent Application JP 2006-062295 filed in the Japanese Patent Office on Mar. 8, 2006, the entire contents of which are incorporated herein by reference.

BACKGROUND

The present disclosure relates to a hologram recording and reconstruction apparatus.

In recent years, holographic memories serving as recording and reconstruction apparatuses capable of recording and reconstructing data at a high transfer rate have been developed. The holographic memories utilize the thickness direction of a recording medium. When recording data, the holographic memories generate interference fringes between a reference light beam and a signal light beam according to data to be recorded in which information is two-dimensionally arranged as a page. The holographic memories three-dimensionally record the interference fringes therein at one time. When reconstructing the data, the holographic memories emit the reference light beam to the generated hologram so as to obtain a diffracted light beam. Thus, the holographic memories reconstruct the recorded data from the diffracted light beam.

In general, two types of holographic recording and reconstruction method are known: a coaxial method and a two-light beam method. In the coaxial method, to record data, a signal light beam is obtained by modulating a light beam emitted from a laser light source using a spatial light modulator. At the same time, a light beam emitted from that laser light source is obtained as a reference light beam. These signal light beam and the reference light beam are coaxially disposed in part of the light path thereof. Finally, these two light beams pass through the same objective lens and are emitted to a holographic recording medium. In this way, interference fringes between the signal light beam and the reference light beam are recorded on the holographic recording medium. To reconstruct the data, a light beam serving as a reference light beam is emitted from the laser light source onto the holographic recording medium to obtain a light beam (a reconstruction light beam) diffracted by the holographic recording medium in part of the light path in which the diffracted light beam is coaxial with the reference light beam. Subsequently, the recorded data is reconstructed from the reconstruction light beam (refer to, for example, Nikkei Electronics, Jan. 17, 2005, pp. 106-114).

In contrast, in the two-light beam method, to record data, a signal light beam and a reference light beam propagate in different light paths and are independently emitted to a holographic recording medium. To reconstruct the data, a reference light beam and a diffracted light beam (a reconstruction light beam) propagate in different light paths.

In recent years, a photopolymer has been used for a medium of a recording layer of a holographic recording medium since photopolymers can be produced at low cost and have high durability and high light sensitivity (refer to, for example, Japanese Unexamined Patent Application Publication No. 2004-226821). However, when a recording and readout layer is composed of the photopolymer, a dimensional change in the recording and readout layer occurs due to contraction occurring when a monomer is changed to a polymer or due to contraction or expansion caused by a change in temperature during recording. Thus, the angle and spacing of a hologram (a diffraction grating) three-dimensionally formed as an interference fringe pattern tend to change. The change in the shape of the diffraction grating changes the angle and spacing of the hologram when data was recorded compared with the angle and spacing of the hologram when the data is reconstructed. As a result, the angle at which peak diffraction efficiency is obtained varies.

If the angle at which peak diffraction efficiency is obtained varies due to temperatures at a recording time and at a reconstruction time being different, a sufficient quality of recorded data reconstructed from the holographic recording medium cannot be obtained. To address this issue, for example, the above-described page is not reconstructed at one time. The page is divided into a plurality of sections, and each section is reconstructed. In such a case, the transfer rate is decreased and the process of recording is complicated, which is significantly problematic. To address this issue, a technology of changing the wavelength of a laser in accordance with temperature has been proposed (refer to, for example, Mitsuru TOISHI et al., "Temperature tolerance improvement with wavelength tuning laser source in holographic data storage", Technical digest of Optical Data Storage/International Symposium on Optical Memory, 2005, paper ThE5).

However, in addition to the method in which the wavelength of the laser is changed in accordance with temperature, an angle correction method in which the incident angle of a light beam incident on a holographic recording medium is changed may be employed. In this case, in the two-light beam method (and/or in an apparatus by the two-light beam method), since a reference light beam propagates in a light path different from that of a signal light beam and a diffracted light beam, the incident angle of the reference light beam on the holographic recording medium can be easily changed. In contrast, in the coaxial method, since a reference light beam, a signal light beam, and a diffracted light beam pass through the same objective lens, it is difficult to provide a hologram recording and reconstruction apparatus that compensates for the recording and reconstruction characteristics in accordance with a change in temperature. As a result, the bit error rate (BER) at a reconstruction time of the recorded data on the holographic recording medium increases. That is, the BER deteriorates, and therefore, excellent recording and reconstruction characteristics cannot be maintained.

SUMMARY

Accordingly, the present embodiments provide a hologram recording and reconstruction apparatus capable of having a low BER and excellently recording and reconstructing data when using a holographic recording medium having characteristics varying in accordance with the temperature thereof and, in particular, when using a holographic recording medium having different characteristics when the temperature of the holographic recording medium at a recording time is different from that at a reconstruction time.

According to an embodiment, a hologram recording and reconstruction apparatus records a hologram in a recording layer of a holographic recording medium by causing a signal light beam modulated in accordance with data to be recorded to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes an objective lens for allowing the signal light beam, the reference light beam, and the diffracted light beam to pass therethrough, a spatial light modulator on which a reference light beam pattern for generating the reference light beam is displayed, a temperature sensor for detecting the temperature of the holographic recording medium, and a control unit for controlling the spatial light modulator to reduce the reference light beam pattern so that the reference light beam passes through the more inner portion of the objective lens or enlarge the reference light beam pattern so that the reference light beam passes through the more outer portion of the objective lens in accordance with the temperature detected by the temperature sensor.

That is, this hologram recording and reconstruction apparatus records a hologram in a recording layer of a holographic recording medium by causing a signal light beam modulated in accordance with data to be recorded to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes an objective lens, a spatial light modulator, a temperature sensor, and a control unit. The objective lens serves as a shared optical member for allowing the signal light beam, the reference light beam, and the diffracted light beam to pass therethrough. A reference light beam pattern for generating the reference light beam is displayed on the spatial light modulator. The temperature sensor detects the temperature of the holographic recording medium. The control unit controls the spatial light modulator to reduce the reference light beam pattern so that the reference light beam passes through the more inner portion of the objective lens or enlarge the reference light beam pattern so that the reference light beam passes through the more outer portion of the objective lens in accordance with the temperature detected by the temperature sensor.

According to another embodiment, a hologram recording and reconstruction apparatus records a hologram in a recording layer of a holographic recording medium by causing a signal light beam modulated in accordance with data to be recorded to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes a spatial light modulator on which a reference light beam pattern for generating the reference light beam is displayed, an objective lens for allowing the signal light beam, the reference light beam, and the diffracted light beam to pass therethrough, focus controlling means for maintaining a predetermined distance between the objective lens and the recording layer, a temperature sensor for detecting the temperature of the holographic recording medium, and a control unit for controlling the distance between the objective lens and the recording layer in accordance with the temperature detected by the temperature sensor.

That is, this hologram recording and reconstruction apparatus records a hologram in a recording layer of a holographic recording medium by causing a signal light beam modulated in accordance with data to be recorded to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes a spatial light modulator, focus controlling means, a temperature sensor, and a control unit. A reference light beam pattern for generating the reference light beam is displayed on the spatial light modulator. The objective lens serves as a shared optical member for allowing the signal light beam, the reference light beam, and the diffracted light beam to pass therethrough. The focus controlling means maintains a predetermined distance between the objective lens and the recording layer. The temperature sensor detects the temperature of the holographic recording medium. The control unit controls the distance between the objective lens and the recording layer in accordance with the temperature detected by the temperature sensor.

According to another embodiment, a hologram recording and reconstruction apparatus records a hologram in a recording layer of a holographic recording medium by causing a signal light beam modulated in accordance with data to be recorded to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes an objective lens for allowing the signal light beam, the reference light beam, and the diffracted light beam to pass therethrough, a spatial light modulator on which a reference light beam pattern for generating the reference light beam is displayed, a relay lens system including two lenses disposed between the objective lens and the spatial light modulator, a temperature sensor for detecting the temperature of the holographic recording medium, and a control unit for controlling the distance between the two lenses in accordance with the temperature detected by the temperature sensor.

That is, this hologram recording and reconstruction apparatus records a hologram in a recording layer of a holographic recording medium by causing a signal light beam modulated in accordance with data to be recorded to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes an objective lens, a spatial light modulator, a relay lens system, a temperature sensor, and a control unit. The objective lens serves as a shared optical member for allowing the signal light beam, the reference light beam, and the diffracted light beam to pass therethrough. A reference light beam pattern for generating the reference light beam is displayed on the spatial light modulator. The relay lens system includes two lenses disposed between the objective lens and the spatial light modulator. The temperature sensor detects the temperature of the holographic recording medium. The control unit controls the distance between the two lenses in accordance with the temperature detected by the temperature sensor.

According to another embodiment, a hologram recording and reconstruction apparatus records a hologram in a recording layer of a holographic recording medium by causing a signal light beam modulated in accordance with data to be recorded to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes an objective lens for allowing the signal light beam, the reference light beam, and the diffracted light beam to pass therethrough, a tunable-wavelength light source for generating a light beam for generating the reference light beam or both the reference light beam and the signal light beam, an image sensor for detecting a reconstruction image generated by the diffracted light beam, a temperature sensor for detecting the temperature of the holographic recording medium, and a control unit for controlling the wavelength of the light beam generated by the tunable-wavelength light source and the distance between the objective lens and the image sensor in accordance with the temperature detected by the temperature sensor.

That is, this hologram recording and reconstruction apparatus records a hologram in a recording layer of a holographic recording medium by causing a signal light beam modulated in accordance with data to be recorded to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes an objective lens, a tunable-wavelength light source, an image sensor, a temperature sensor, and a control unit. The objective lens serves as a shared optical member for allowing the signal light beam, the reference light beam, and the diffracted light beam to pass therethrough. The tunable-wavelength light source for generating a light beam generates the reference light beam or both the reference light beam and the signal light beam. The image sensor detects a reconstruction image generated by the diffracted light beam. The temperature sensor detects the temperature of the holographic recording medium. The control unit controls the wavelength of the light beam generated by the tunable-wavelength light source and the distance between the objective lens and the image sensor in accordance with the temperature detected by the temperature sensor.

According to another embodiment, a hologram recording and reconstruction apparatus records a hologram in a recording layer of a holographic recording medium by causing a signal light beam modulated in accordance with data to be record to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes a spatial light modulator on which a reference light beam pattern for generating the reference light beam is displayed, an objective lens for allowing the signal light beam, the reference light beam, and the diffracted light beam to pass therethrough, a tunable-wavelength light source for generating a light beam for generating the reference light beam or generating the reference light beam and the signal light beam, a relay lens system including two lenses disposed between the objective lens and the spatial light modulator, a temperature sensor for detecting the temperature of the holographic recording medium, and a control unit for controlling the wavelength of the light beam generated by the tunable-wavelength light source and the distance between the two lenses of the relay lens system in accordance with the temperature detected by the temperature sensor.

That is, this hologram recording and reconstruction apparatus for recording a hologram in a recording layer of a holographic recording medium by causing a signal light beam modulated in accordance with data to be recorded to interfere with a reference light beam. The signal light beam and the reference light beam are emitted from the same light source. The hologram recording and reconstruction apparatus reconstructs the recorded data from a diffracted light beam generated by emitting the reference light beam onto the recording layer. The hologram recording and reconstruction apparatus includes a spatial light modulator, an objective lens, a tunable-wavelength light source, a relay lens system, a temperature sensor, and a control unit. A reference light beam pattern for generating the reference light beam is displayed on the spatial light modulator. The objective lens serves as a shared optical member for allowing the signal light beam, the reference light beam, and the diffracted light beam to pass therethrough. The tunable-wavelength light source generates a light beam for generating the reference light beam or generating the reference light beam and the signal light beam. The relay lens system includes two lenses disposed between the objective lens and the spatial light modulator. The temperature sensor detects the temperature of the holographic recording medium. The control unit controls the wavelength of the light beam generated by the tunable-wavelength light source and the distance between the two lenses of the relay lens system in accordance with the temperature detected by the temperature sensor.

According to the present embodiments, a hologram recording and reconstruction apparatus capable of having a low BER and highly accurately recording and reconstructing data even when the temperature of the holographic recording medium at a recording time is different from that at a reconstruction time.

Additional features and advantages are described herein, and will be apparent from, the following Detailed Description and the figures.

DETAILED DESCRIPTION

Exemplary embodiments are described below with reference to the accompanying drawings. A coaxial hologram recording and reconstruction apparatus including a coaxial optical system is briefly described first. Thereafter, the effect of a change in the shape of a hologram formed in a holographic recording medium on recording and reconstruction operations is briefly described. Finally, the key components of the hologram recording and reconstruction apparatus that provide the specific features of the exemplary embodiments are described.

Hologram Recording and Reconstruction Apparatus Using Coaxial Method

In a hologram recording and reconstruction apparatus using the coaxial method, a signal light beam and a reference light beam, which are described below, share part of a light path. Accordingly, recording and reconstruction can be performed using a single objective lens, resulting in a simple optical system. Furthermore, since the compatibility with existing compact discs (CDs) and digital versatile discs (DVDs) can be easily realized, a hologram recording and reconstruction apparatus using the coaxial method has recently attracted attention for next-generation apparatuses.

Figure 1:
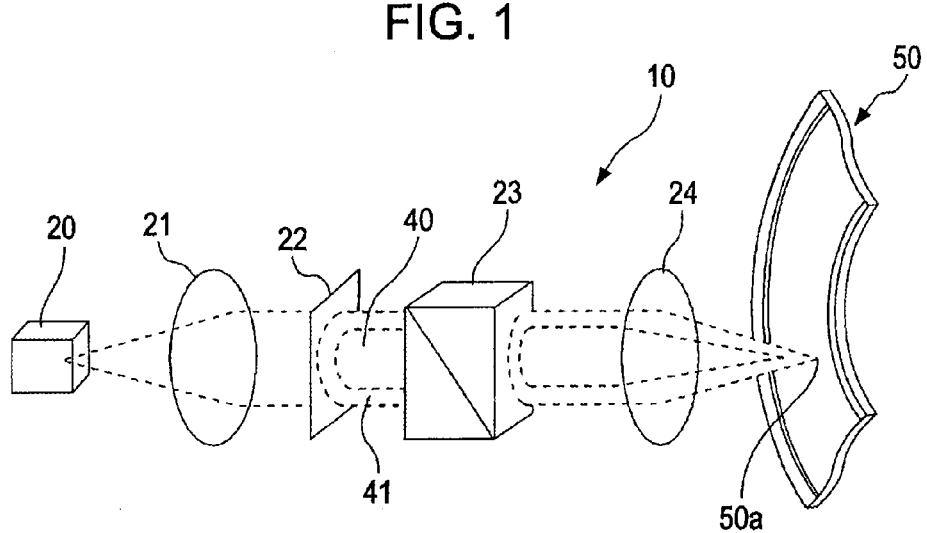
FIG. 1 is a schematic illustration of a coaxial optical system used in a hologram recording apparatus by a coaxial method.

FIG. 1 is a conceptual illustration of a coaxial optical system 10 used in a hologram recording apparatus by a coaxial method. The coaxial optical system 10 includes the following optical components: a laser light source 20, a collimating lens 21, a spatial light modulator 22 including a transmissive liquid crystal, a beam splitter 23, and an objective lens 24.

Figure 2:
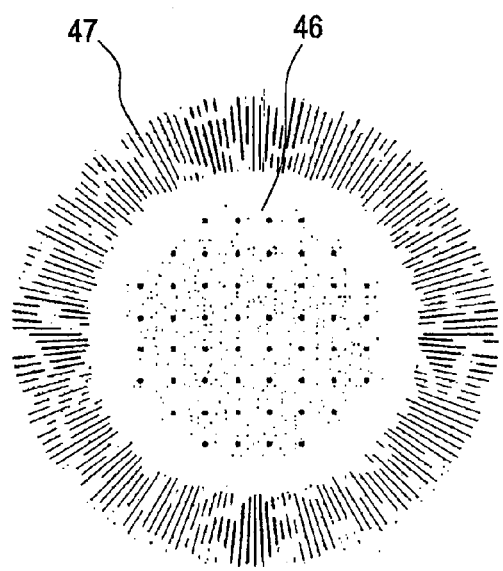
FIG. 2 illustrates an example of a pattern displayed on a spatial light modulator.

A light beam emitted from the laser light source 20 is transformed into a parallel light beam by the collimating lens 21 and passes through the spatial light modulator 22. As shown in FIG. 2, an area through which the light beam passes is separated into a signal light beam sub-area 46 that displays signal light beam pattern on the basis of data to be recorded generated by the spatial light modulator 22 and a reference light beam sub-area 47 that displays a reference light beam pattern. The light beam passing through these two sub-areas are separated into a signal light beam 40 and a reference light beam 41. The signal light beam 40 and the reference light beam 41 pass through the beam splitter 23 and the objective lens 24 along the same light path and are made incident on a recording layer 50a of a holographic recording medium 50 (see FIG. 6). The signal light beam 40 generated by the signal light beam sub-area 46 interferes with the reference light beam 41 generated by the reference light beam sub-area 47 in the recording layer 50a. Since the index of refraction of a small area in the recording layer 50a changes in accordance with the state of the interference, the data to be recorded is recorded in the form of a diffraction grating (hologram) as an optical member in accordance with the pattern of the index of refraction.

FIG. 2 illustrates an example of the pattern displayed on the spatial light modulator 22. In this pattern, the signal light beam sub-area 46 occupies the center area and the reference light beam sub-area 47 surrounds the signal light beam sub-area 46. In FIG. 2, a black portion (a dark portion) blocks a light beam whereas a white portion (a bright portion) allows a light beam to be transmitted therethrough. The transmittance of a light beam changes in accordance with the bright/dark ratio. Note that, in a reflective spatial light modulator 22a (see FIG. 5), which is described below, a black portion (a dark portion) represents an area where a small amount of a light beam is reflected whereas a white portion (a bright portion) represents an area where a large amount of a light beam is reflected.

Figure 3:
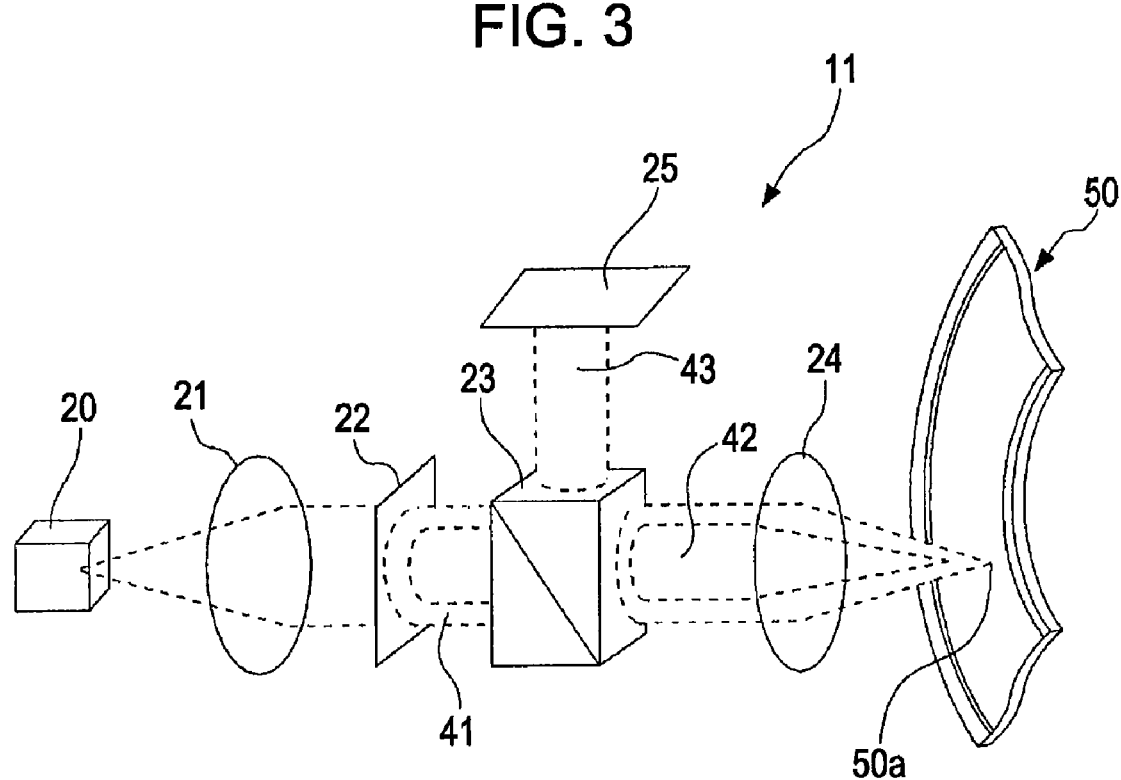
FIG. 3 is a schematic illustration of a coaxial optical system used in a hologram recording apparatus using a coaxial method.

FIG. 3 is a conceptual illustration of a coaxial optical system 11 used in a hologram recording apparatus by a coaxial method. Like the coaxial optical system 10, the coaxial optical system 11 includes the laser light source 20, the collimating lens 21, the spatial light modulator 22, the beam splitter 23, and an objective lens 24. In addition, the coaxial optical system 11 includes an image sensor 25 composed of, for example, a charged coupled device (CCD).

To reconstruct recorded data, only the pattern of the reference light beam sub-area 47 is displayed on the spatial light modulator 22 and the signal light beam sub-area 46 shows an all-black pattern (a pattern having only a black portion that blocks a light beam). The coaxial optical system 11 allows the reference light beam 41 propagating from the reference light beam sub-area 47 to pass through the beam splitter 23 and the objective lens 24. Subsequently, the reference light beam 41 is made incident on a hologram formed in the recording layer 50a of the holographic recording medium 50 so that the recorded data is reconstructed. This reference light beam 41 generates a diffracted light beam 42 in accordance with the hologram. The propagation direction of the diffracted light beam 42 is changed by the beam splitter 23. Thereafter, the diffracted light beam 42 illuminates the image sensor 25 as a reconstruction light beam (diffracted light beam) 43. Since an electrical signal output from the image sensor 25 is a signal in accordance with the data to be recorded, a control unit 60 can reconstruct the recorded data from this electrical signal.

Here, the hologram recording and reconstruction apparatus includes the structures of both the coaxial optical system 10 and the coaxial optical system 11. That is, the hologram recording and reconstruction apparatus includes a structure similar to that of the coaxial optical system 11. When recording data, the spatial light modulator 22 can display a pattern for the signal light beam sub-area 46 and a pattern for the reference light beam sub-area 47 surrounding the signal light beam sub-area 46. When reconstructing the data, the spatial light modulator 22 displays the reference light beam pattern in the reference light beam sub-area 47 and the above-described all-black pattern in the signal light beam sub-area 46 so that the signal light beam sub-area 46 does not pass a light beam therethrough. In this way, the hologram recording and reconstruction apparatus can record and reconstruct data.

Figure 4:
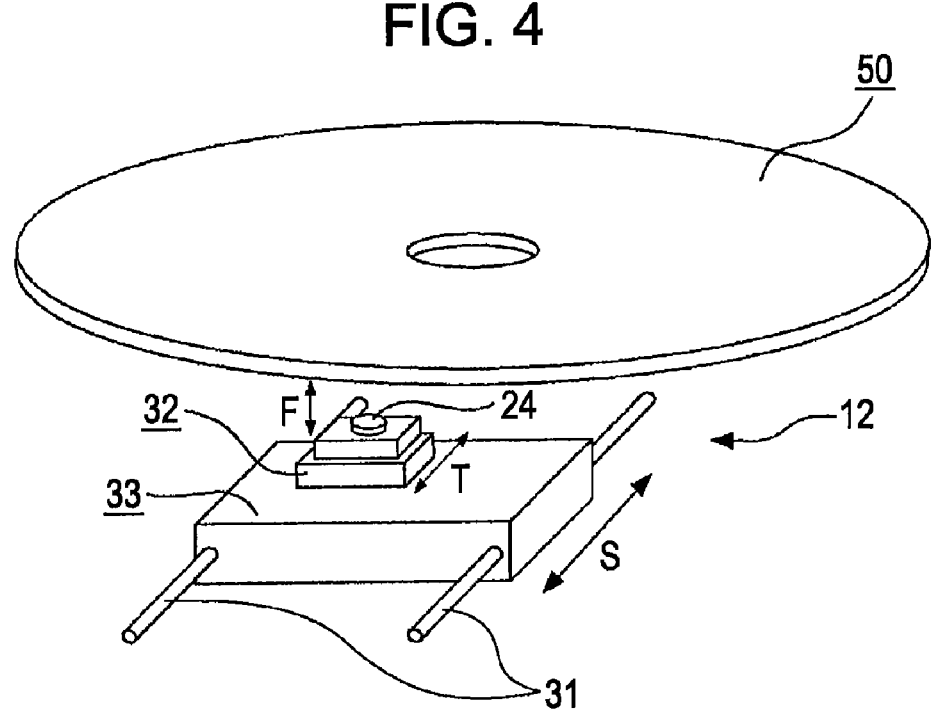
FIG. 4 is a schematic illustration of a primary mechanism of a hologram recording and reconstruction apparatus using the coaxial method.

FIG. 4 is a schematic external illustration of a primary mechanism 12 of a hologram recording and reconstruction apparatus 100 using the coaxial method. The hologram recording and reconstruction apparatus 100 performs recording and reconstruction using the holographic recording medium 50. The holographic recording medium 50 has a disk shape. The disk-shaped holographic recording medium 50 rotates about the geometric center point thereof. That is, geometrically, the holographic recording medium 50 has a disk shape similar to that of existing CDs and DVDs.

The holographic recording medium 50 has a mounting hole at the center thereof. Like the CDs and DVDs, the holographic recording medium 50 is mounted on a spindle motor (not shown) and is rotated by the spindle motor. An optical device 33 including an objective lens unit 32 with the objective lens 24 is disposed so that the objective lens 24 faces a recording layer (see FIG. 2) of the holographic recording medium 50 and emits a light beam onto the recording layer.

The optical device 33 includes all the above-described components forming the coaxial optical system 11. The optical device 33 further includes part of an electrical circuit connected to the laser light source 20, the spatial light modulator 22, and the image sensor 25. Still furthermore, the optical device 33 includes an objective lens actuator (see a block indicated by a reference numeral 54 in FIG. 5) in order to control the position of a light beam relative to the holographic recording medium 50.

Here, the objective lens actuator can move the objective lens 24 in a focusing direction (a direction indicated by two-headed arrow F) in which a relative distance between the objective lens 24 and the recording layer of the holographic recording medium 50 is changed. In addition, the objective lens actuator can move the objective lens 24 in a radial direction of the objective lens 24 and the holographic recording medium 50 (a direction indicated by a two-headed arrow T, i.e., a direction from the front to the back of the page or vice versa).

That is, by changing a relative distance between the objective lens 24 and the recording layer of the holographic recording medium 50, the beam spot can be changed into a predetermined size. Additionally, by changing the position of the objective lens 24 relative to the holographic recording medium 50 in the radial direction thereof, the optical device 33 can emit the light beam to a predetermined location of the holographic recording medium 50 so as to record and reconstruct data at the specific location of the holographic recording medium 50. A signal for controlling the objective lens actuator 54 to move the objective lens 24 is generated by the control unit 60 (see FIG. 5) after the control unit 60 processes an electrical signal input from a photodetector 29 included in a servo optical system 30, which is described in more detail below.

In addition, the objective lens actuator 54 included in the optical device 33 cannot largely change the position of the objective lens 24 relative to that of the holographic recording medium 50. Accordingly, to move the whole optical device 33 relative to the holographic recording medium 50 in the radial direction, the optical device 33 is supported by shafts 31 so as to be largely moved in the radial direction (the direction indicated by an arrow S) by means of, for example, a motor (not shown).

Figure 5:
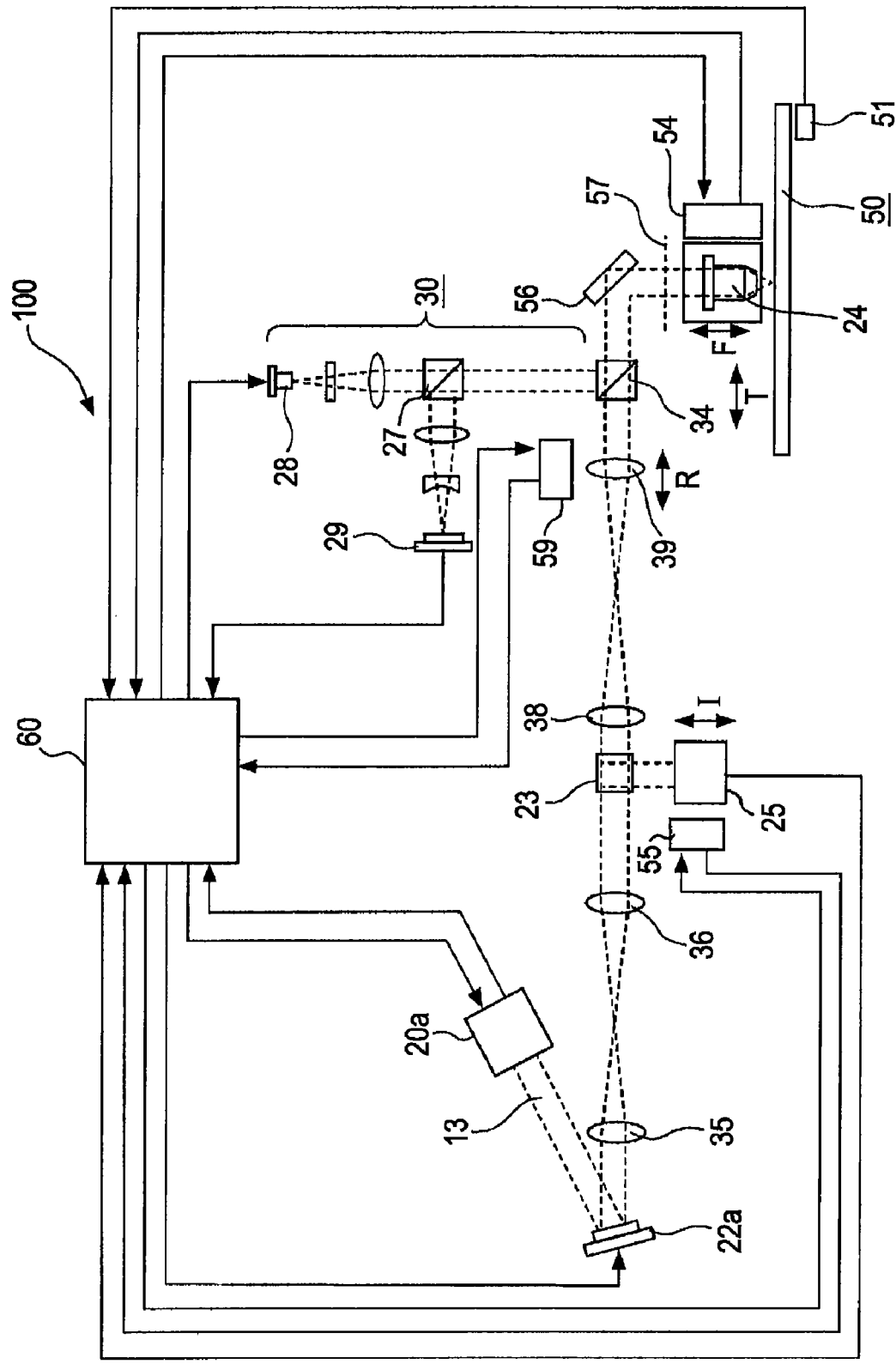
FIG. 5 is a schematic illustration of a primary mechanism of a hologram recording and reconstruction apparatus by the coaxial method according to an embodiment.

FIG. 5 is a block diagram illustrating a main potion of the hologram recording and reconstruction apparatus 100 according to the present embodiment. In particular, FIG. 5 mainly illustrates a portion included in the optical device 33 shown in FIG. 4. Similar numbering will be used in describing FIG. 5 as was utilized above in the foregoing description and descriptions thereof are not repeated. In FIG. 5, a laser light source 20a is used in place of the laser light source 20 shown in FIGS. 1 and 3. The laser light source 20a can change the wavelength of a laser light beam. The laser light source 20a is described in more detail below.

A reflective spatial light modulator 22a is used in place of the transmissive spatial light modulator 22 shown in FIGS. 1 and 3. However, the operation of the spatial light modulator 22a is similar to that of the spatial light modulator 22. Two relay lenses 35 and 36 form a first relay lens system whereas two relay lenses 38 and 39 form a second relay lens system. A reflecting mirror 56 changes the propagation direction of a light beam. The first relay lens system and the second relay lens system are disposed between the objective lens 24 and the spatial light modulator 22a. The first relay lens system and the second relay lens system are used for causing the image sensor 25 to generate a real image (a reconstruction image) from a light beam that has been spatially modulated and has passed through the optical system.

In addition, the optical device 33 includes the servo optical system 30. Only primary components of the servo optical system 30 are designated by reference numerals and described. A servo light source 28 emits a servo light beam used for servo control. The wavelength of the servo light beam is different from that of a light beam emitted from the laser light source 20a used for recording and reconstructing data. The wavelength of the servo light beam is longer than that of the light beam emitted from the laser light source 20a. For example, the servo light beam is a red laser beam. Thus, the servo light beam can be separated from a recording and reconstructing light beam for recording and reconstructing data.

A beam splitter 27 guides a returning light beam from the holographic recording medium 50 to a photodetector 29. The photodetector 29 partitions a detector for a focus servo into a plurality of areas in a manner suitable for the astigma method and partitions a detector for a radial (tracking) servo into a plurality of areas in a manner suitable for the push-pull method. A dichroic mirror 34 is shared by the servo optical system 30 and the recording and reconstruction optical system. The dichroic mirror 34 serves as a wavelength separating element that separates a servo light beam from the recording and reconstructing light beam.

The operation of the hologram recording and reconstruction apparatus 100 is described next briefly. The recording operation of the hologram recording and reconstruction apparatus 100 is described first.

A light beam 13 emitted from the laser light source 20a is made incident on the spatial light modulator (SLM) 22a. Here, a pattern displayed on the spatial light modulator 22a is similar to the pattern shown in FIG. 2. This pattern includes a pattern for the signal light beam sub-area 46 and a pattern for the reference light beam sub-area 47. To record data on the holographic recording medium 50, the spatial light modulator 22a displays a signal light beam pattern for generating a signal light beam in the signal light beam sub-area 46 on the basis of data to be recorded. In addition, the spatial light modulator 22a displays a reference light beam pattern for generating a reference light beam in the reference light beam sub-area 47.

Each of the signal light beam and the reference light beam passes through the first relay lens system (relay lenses 35 and 36). Subsequently, each of the signal light beam and the reference light beam passes through the beam splitter 23, the second relay lens system (relay lenses 38 and 39), and the dichroic mirror 34. Thereafter, each of the signal light beam and the reference light beam is reflected by the reflecting mirror 56 and forms an image at an imaging point 57. This image is focused so as to have a beam size suitable for recording and reconstructing data by the objective lens 24 and is projected onto the holographic recording medium 50. The signal light beam and the reference light beam overlap in the recording layer (see a portion indicated by a reference numeral 50a in FIG. 6) of the holographic recording medium 50 so as to form a hologram. Thus, the data to be recorded is recorded on the holographic recording medium 50.

In this case, the light beam for recording and reconstructing data is controlled by the focus and radial servo system including the servo optical system 30 so as to be focused on a reflecting film 50b (see FIG. 6) disposed on the rear side of the recording layer 50a (see FIG. 6) of the holographic recording medium 50. As used herein, the term "rear side" refers to a rear side when the incident side of the light beam is defined as a front side. Thus, the light beam is made incident on the holographic recording medium 50 at a predetermined location in the radial direction. In addition, a spindle servo system including the spindle motor controls the holographic recording medium 50 to have a predetermined rotation angle. The light beam output from the servo optical system 30 is reflected off the dichroic mirror 34 and the reflecting mirror 56. Subsequently, the light beam passes through the objective lens 24 and is made incident on the holographic recording medium 50.

The holographic recording medium 50 has an address groove (see a block designated by the reference numeral 50c) used for positioning the recording and reconstruction light beam and the servo light beam. The servo optical system 30 has a structure similar to that for existing CDs and DVDs and can detect the positions of the recording and reconstruction light beam and the servo light beam on the holographic recording medium 50 on the basis of an electrical signal output from the photodetector 29. That is, a relationship between the recording and reconstruction light beam and the servo light beam is uniquely determined by the positional relationship among the optical components of the optical systems for recording and reconstructing data and the servo control. Accordingly, by determining the positional relationship between the servo light beam and the holographic recording medium 50 by the above-described focus and radial servo systems and spindle servo system, the positional relationship between the recording and reconstruction light beam and the servo light beam can be controlled.

That is, signals such as a focus error signal and a tracking error signal are detected from the photodetector 29 of the servo optical system 30. Subsequently, a focus tracking servo circuit (not shown) in the control unit 60 controls the objective lens actuator 54 including a focus actuator and a tacking actuator on the basis of these error signals so that the objective lens 24 is displaced in the directions designated by the reference symbols "F" and "T" in FIG. 5. Thus, each of the servo light beam and the recording and reconstruction light beam is emitted to the target location on the holographic recording medium 50.

Here, the imaging point 57 of the recording pattern image generated by the spatial light modulator 22a is determined by the position of the relay lens 39 in a direction indicated by arrow R and the focal length. In addition, an appropriate distance between the imaging point 57 and the objective lens 24 is maintained by the operation of the focus servo system so that the focal point is formed on the reflecting film 50b of the holographic recording medium 50.

The relay lens 39 can be moved in a direction indicated by arrow R by a relay lens actuator 59. The relay lens actuator 59 may move the relay lens 39 in a direction indicated by arrow R in a feed-forward manner. However, to precisely move the relay lens 39, in the present embodiment, the relay lens actuator 59 includes a position sensor to precisely detect the position of the relay lens 39 and locate the relay lens 39 at a predetermined position. Here, the relay lens actuator 59 is an actuator for generating a driving force using, for example, an electromagnetic force. In addition, the relay lens 39 is movable on a guide rail so that to position of the relay lens 39 is precisely determined. The driving force of the relay lens 39 is generated by the relay lens actuator 59, and the distance between the relay lenses 38 and 39 can be precisely changed.

The hologram recording and reconstruction apparatus 100 further includes an image sensor actuator 55 for moving the image sensor 25 in a direction indicated by arrow I. The position of the image sensor 25 is controlled by sending a control signal from the control unit 60 to the image sensor actuator 55. The detail of this control is described later. Here, the structure of the image sensor actuator 55 is similar to that of the relay lens actuator 59. For example, the image sensor actuator 55 generates a driving force using an electromagnetic force. In addition, the whole image sensor 25 is movable on a guide rail so that to position of the image sensor 25 is precisely determined. The driving force of the image sensor 25 is generated by the image sensor actuator 55, and the distance between the objective lens 24 and the image sensor 25 can be precisely changed.

Figure 6:
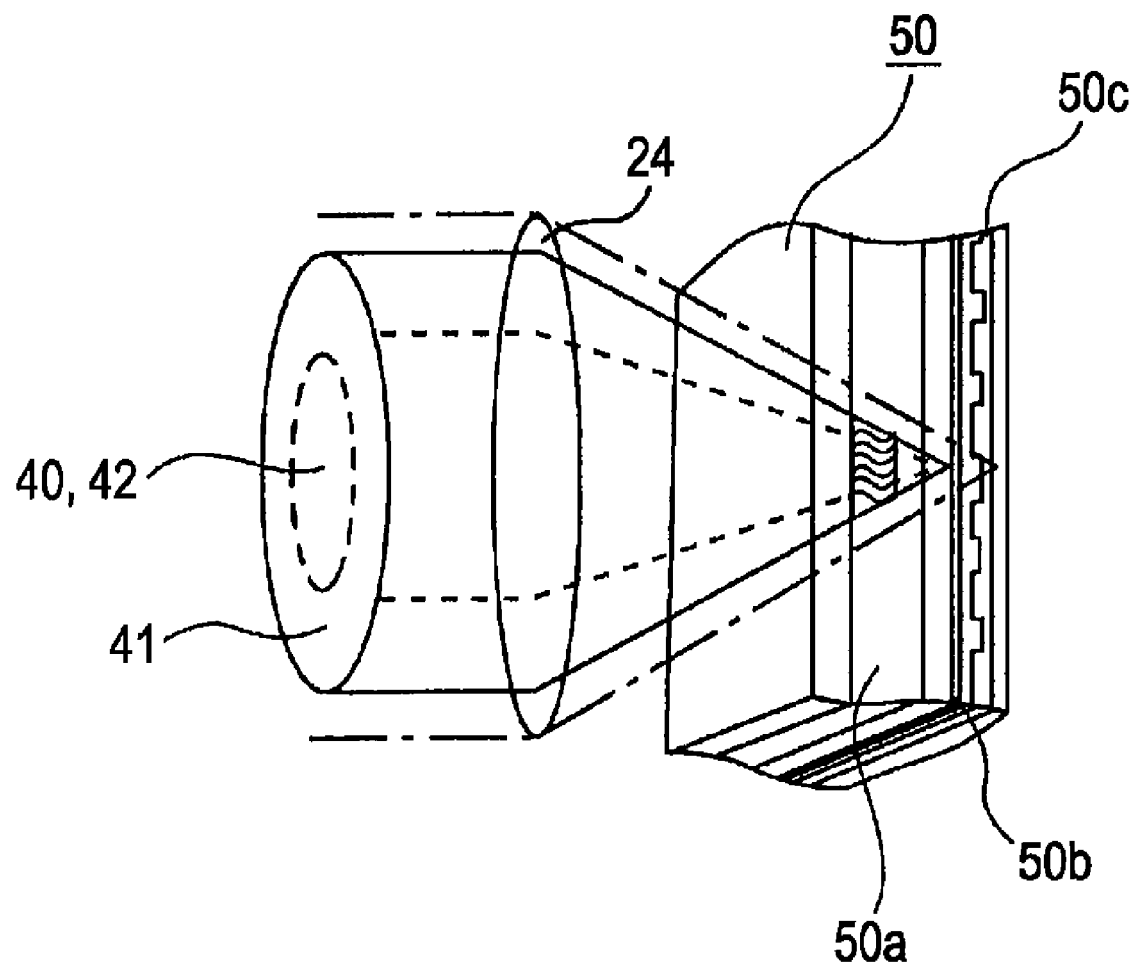
FIG. 6 is a schematic cross-sectional illustration of the structure of a holographic recording medium.

A temperature sensor 51 detects the temperature of the hologram recording layer 50a (see FIG. 6). For example, the temperature sensor 51 may include a thermistor disposed adjacent to the holographic recording medium 50. The thermistor changes a temperature to a resistance value to detect the temperature. Alternatively, the temperature sensor 51 may detect the temperature of the recording layer 50a by detecting a change in the index of refraction of the recording layer 50a. For example, to detect a change in the index of refraction, a light beam for detecting the index of refraction other than the servo light beam and the recording and reconstruction light beam may be emitted to the recording layer 50a. Subsequently, a photodetector may detect the position of a returning light beam of this light beam for detecting the index of refraction. Alternatively, a commercially-available temperature sensor by thermography may be employed. How to use the temperature sensor is described later.

Structure of Hologram Recording Medium

FIG. 6 is a schematic illustration of the cross-sectional structure of the holographic recording medium 50. FIG. 6 further illustrates how the following light beams are made incident on the objective lens 24: the signal light beam 40 and the diffracted light beam 42 (light beams incident from the outermost periphery and indicated by a solid line), the reference light beam 41 (a light beam incident from the outermost periphery and indicated by a dotted line), and a servo light beam (a light beam incident from the outermost periphery and indicated by an alternate long and short dash line). The holographic recording medium 50 includes the recording layer 50a, the reflecting film 50b for reflecting the recording and reconstruction light beam, and the address groove 50c.

When data is recorded, a hologram is formed in the recording layer 50a in accordance with the state of interference fringes generated by interference between the signal light beam 40 and the reference light beam 41. When the data is reconstructed, only the reference light beam 41 is emitted onto the hologram and is reflected by the reflecting film 50b so that the diffracted light beam 42 is generated in the same area as that of the recording signal light beam 40 in accordance with the hologram. In contrast, the servo light beam passes through the reflecting film 50b having a wavelength selectivity and is reflected by an aluminum reflecting film having the address groove 50c thereon. By means of the same principle utilized for CDs and DVDs, the control unit 60 can acquire error signals for the above-described servos, such as the focus servo, the radial servo, and servo required for controlling the rotation of a spindle motor on the basis of electrical signals detected from the photodetector 29 of the servo optical system 30. In addition, the control unit 60 can acquire an address signal for identifying the position (the address) to which the light beam is emitted on the holographic recording medium 50.

Effect of Change in Shape of Hologram on Recording and Reconstructing Operations The effect of the temperature of the recording layer 50a formed of a photopolymer when the temperatures at a recording time and a reconstruction time are different is now described.

In the case of the holographic recording medium 50 formed of a photopolymer, the shape of a diffraction grating is changed due to contraction occurring when data is recorded and a monomer changes into a polymer or due to a temperature when data is recorded or the data is reconstructed. How the change in the shape of the diffraction grating causes a change in the recording characteristic is described next with reference to FIGS. 7 to 9.

Figure 7:
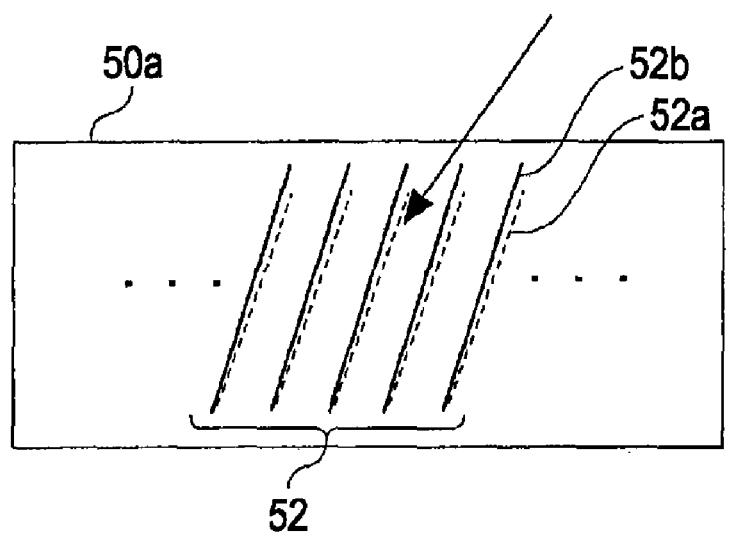
FIG. 7 is a schematic illustration of a change in the shape of a hologram due to a change in the temperature of a holographic recording medium.

FIG. 7 is a schematic illustration of a hologram formed when a photopolymer is used for the recording layer 50a of the holographic recording medium 50. Note that FIG. 7 is a cross-sectional view of the recording layer 50a, and a signal light beam and a reference light beam are made incident from the upper section of the drawing. An arrow in FIG. 7 schematically indicates one of the signal light beams or one of the reference light beams (i.e., one beam of a plurality of virtual light beams representing the incident light beam).

As noted above, interference fringes are generated by the signal light beam and the reference light beam. Accordingly, a three-dimensional hologram (diffraction grating) 52 is generated in the recording layer 50a. In FIG. 7, the hologram 52 is shown by solid lines and dotted lines. The solid line 52b schematically illustrates a hologram created immediately after a recording operation is performed. In contrast, the dotted line 52a schematically illustrates the hologram during reconstructing data at a temperature different from that at a recording time.

Here, if the difference between the temperature of the recording layer 50a at a recording time and the temperature of the recording layer 50a at a reconstruction time is large, the shapes of the hologram indicated by the solid line 52b and the dotted line 52a are largely different. Furthermore, the slight contraction of the hologram occurs due to the contraction of the recording layer 50a occurring immediately after a recording operation is performed. However, the amount of this contraction does not largely effect the recording and reconstruction characteristic.

Figure 8:
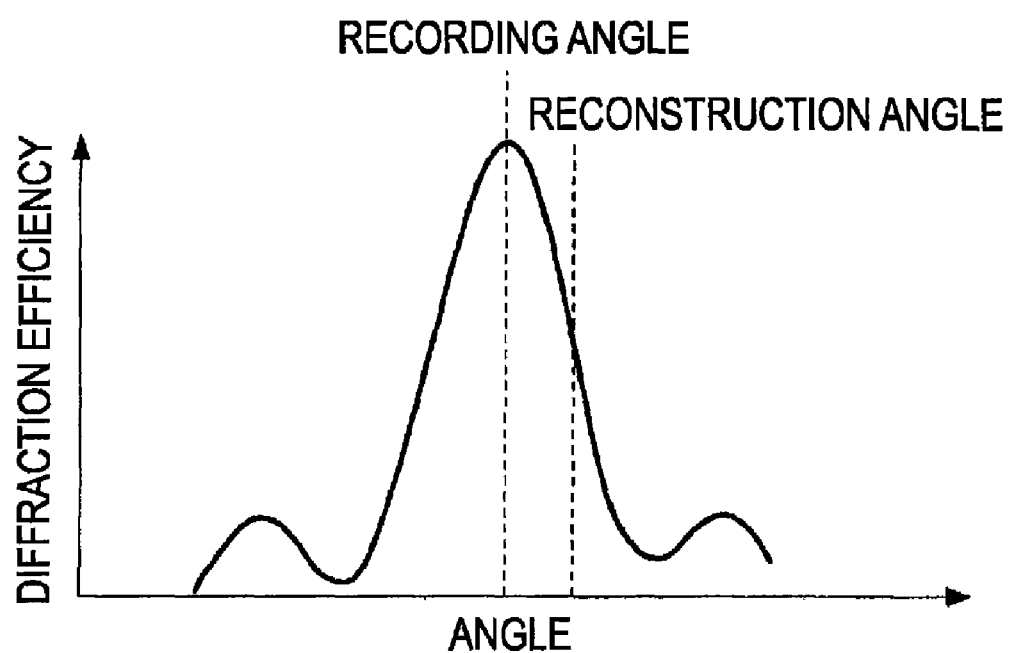
FIG. 8 is a graph illustrating diffraction efficiencies at a recording angle and a reconstruction angle when the shape of the hologram changes.
Figure 9:
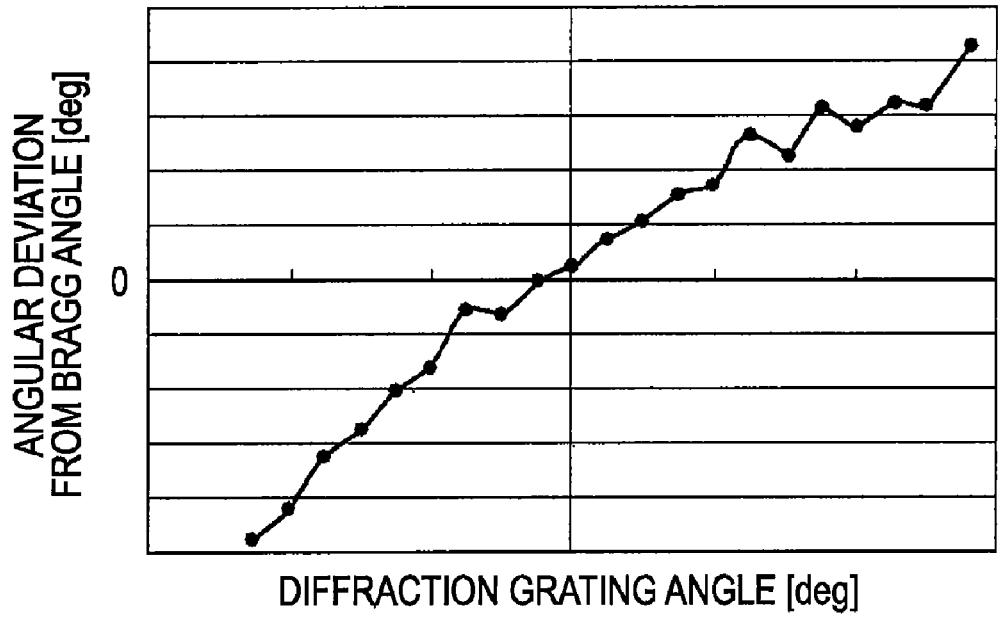
FIG. 9 illustrates a relationship between a diffraction grating angle and an angular deviation from the Bragg angle of a diffracted light beam.

As a result, as shown in FIG. 8, the angle at which the diffraction efficiency at a recording time is maximal is shifted from the angle at which the diffraction efficiency at a reconstruction time is maximal. FIG. 9 illustrates a relationship between the hologram (diffraction grating) angle and an angular deviation from the Bragg angle. As shown in FIG. 9, the peak position of the angle selectivity of the diffraction light beam varies in accordance with the diffraction grating angle.

The effect of a change in the shape of the hologram in the recording layer 50a on the recording and reconstruction characteristic of the hologram recording and reconstruction apparatus is described next with reference to FIG. 10.

As shown in FIG. 7, the angle of the hologram 52 varies depending on each of the light beams of the signal light beam 40 emitted from different locations of the spatial light modulator 22. That is, the angular deviation from the Bragg angle caused by the extraction or contraction of the hologram recording medium varies depending on the change in temperature. Thus, an image is not uniformly output. That is, the bit error rate (BER), which is one of the recording and reconstruction characteristics, deteriorates, and therefore, the performance of the recording and reconstruction operation is difficult.

Figure 10:
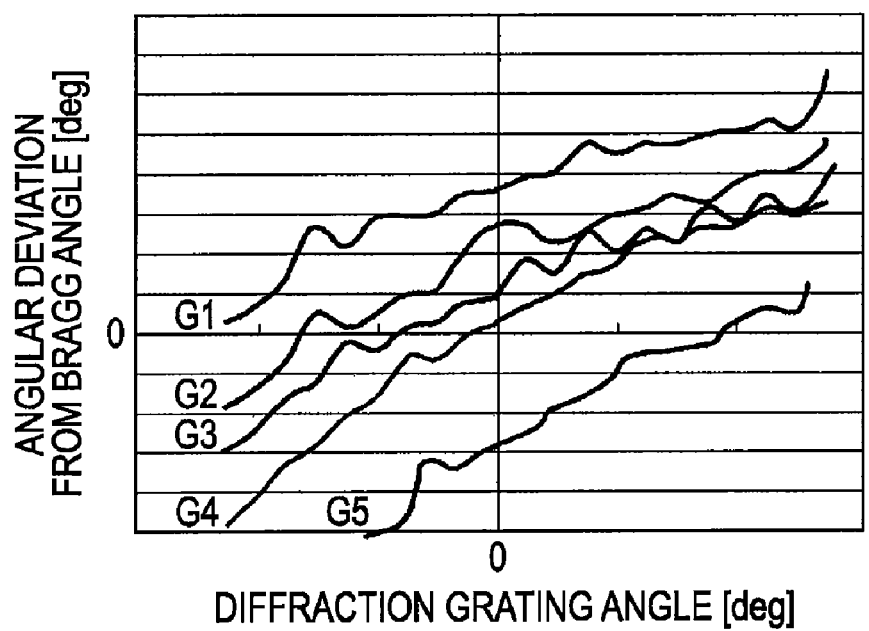
FIG. 10 illustrates a relationship between a diffraction grating angle and an angular deviation from the Bragg angle of a diffracted light beam when the wavelength is changed at a reconstruction time.

In FIG. 10, curves G1 to G5 show characteristics in which, when a recording operation is performed, the holographic recording medium 50 is maintained at a given temperature and the light beam is maintained at a given wavelength and, when a reconstruction operation is performed, the temperature of the holographic recording medium 50 is different from that in the recording operation. That is, FIG. 10 illustrates a relationship between a diffraction grating angle and the angular deviation from the Bragg angle for each of the wavelengths of a reconstruction laser light beam when the temperature of the hologram recording medium at a recording time is different from that at a reconstruction time. That is, in FIG. 10, the wavelength of a reconstruction laser light beam serves as a parameter. The curve G1 indicates the relationship when the longest wavelength of the laser beam is used whereas the curve G5 indicates the relationship when the shortest wavelength of the laser beam is used. As the wavelength of the laser beam is decreased, the relationship is shown by the curve G2, G3, or G4. Here, the curve G4 indicates the relationship when the wavelength of a laser beam used for recording data is the same as that of a laser beam used for reconstructing data.

Figure 11:
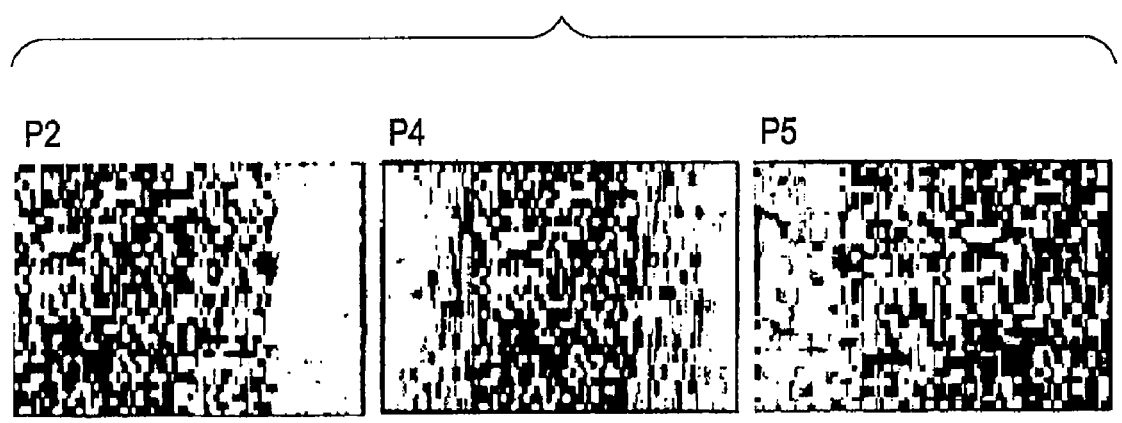
FIG. 11 illustrates pattern images formed when the wavelength is changed at a reconstruction time.

FIG. 11 illustrates a reconstruction pattern image P2 corresponding to the wavelength that provides the curve G2, a reconstruction pattern image P4 corresponding to the wavelength that provides the curve G4, and a reconstruction pattern image P5 corresponding to the wavelength that provides the curve G5. These three wavelengths are typical ones used for the reconstruction light beam.

When information is reconstructed by emitting, to the recording layer 50a, a light beam having a wavelength providing the characteristic indicated by the curve G4 shown in FIG. 10, the reconstruction pattern image P4 can be formed on a light receiving surface of the image sensor 25. In the reconstruction pattern image P4, the central portion is precisely reconstructed. However, a pattern in either end portion of the reconstruction pattern image P4 is missing. Note that FIG. 11 is a schematic illustration of reconstruction pattern images and, in practice, the contrast of the reconstruction pattern image P4 decreases towards either end of the image. Thus, the reconstruction pattern image P4 is different from the pattern image at the recording time.

In addition, when information is reconstructed by emitting, to the recording layer 50a, a light beam having a wavelength providing the characteristic indicated by the curve G2 shown in FIG. 10, that is, by emitting a laser beam having a wavelength longer than that of the laser beam used for obtaining the reconstruction pattern image P4, the reconstruction pattern image P2 shown in FIG. 11 can be formed on the light receiving surface of the image sensor 25. In the reconstruction pattern image P2, the left portion (when viewed from the front of the drawing) is precisely reconstructed. However, the contrast of the right portion (when viewed from the front of the drawing) is decreased.

Furthermore, when information is reconstructed by emitting, to the recording layer 50a, a light beam having a wavelength providing the characteristic indicated by the curve G5 shown in FIG. 10, that is, by emitting a laser beam having a wavelength shorter than that of the laser beam used for obtaining the reconstruction pattern image P4, the reconstruction pattern image P5 shown in FIG. 11 can be formed on the light receiving surface of the image sensor 25. In the reconstruction pattern image P5, the right portion (when viewed from the front of the drawing) is precisely reconstructed. However, the contrast of the left portion (when viewed from the front of the drawing) is decreased.

If the difference between a temperature of the recording layer 50a at a recording time and a temperature of the recording layer 50a at a reconstruction time is large, the above-described phenomenon occurs. As a result, reconstruction of a pattern image recorded at one time is difficult.

That is, by changing the wavelength of a reconstruction laser beam in accordance with a difference between the temperature of the holographic recording medium 50 at a recording time and the temperature of the holographic recording medium 50 at a reconstruction time, the portion that can be reconstructed can be changed. Therefore, by sequentially changing the wavelength of the reconstruction laser beam (hereinafter referred to as "multiple scanning"), the reconstruction performance can be improved. Note that, since the reconstruction characteristic is also affected by the temperature at a recording time, the term "recording and reconstruction characteristic" is sometimes used with the same meaning as the reconstruction characteristic.

The structures of the laser light source 20a that can change the wavelength of a light beam and the optical system that can change an incident angle $\theta_R$ of a reference light beam are described in more detail below. The laser light source 20a and the optical system are key components of the hologram recording and reconstruction apparatus according to the present embodiment. Here, to change the incident angle $\theta_R$ of a reference light beam, the optical system by the two-light beam method may includes, for example, an angle variable mirror (not shown), which is a reflecting mirror for changing the incident angle, disposed in the propagation path of the reference light beam which is different from the propagation path of the signal light beam. Thus, the optical system can easily change the incident angle $\theta_R$ of a reference light beam. In contrast, the hologram recording apparatus by the coaxial method cannot employ such a simple structure. According to the present embodiment, a specific structure that has not been developed before is employed. This specific structure is described below.

Tunable-Wavelength Laser Light Source

Figure 12:
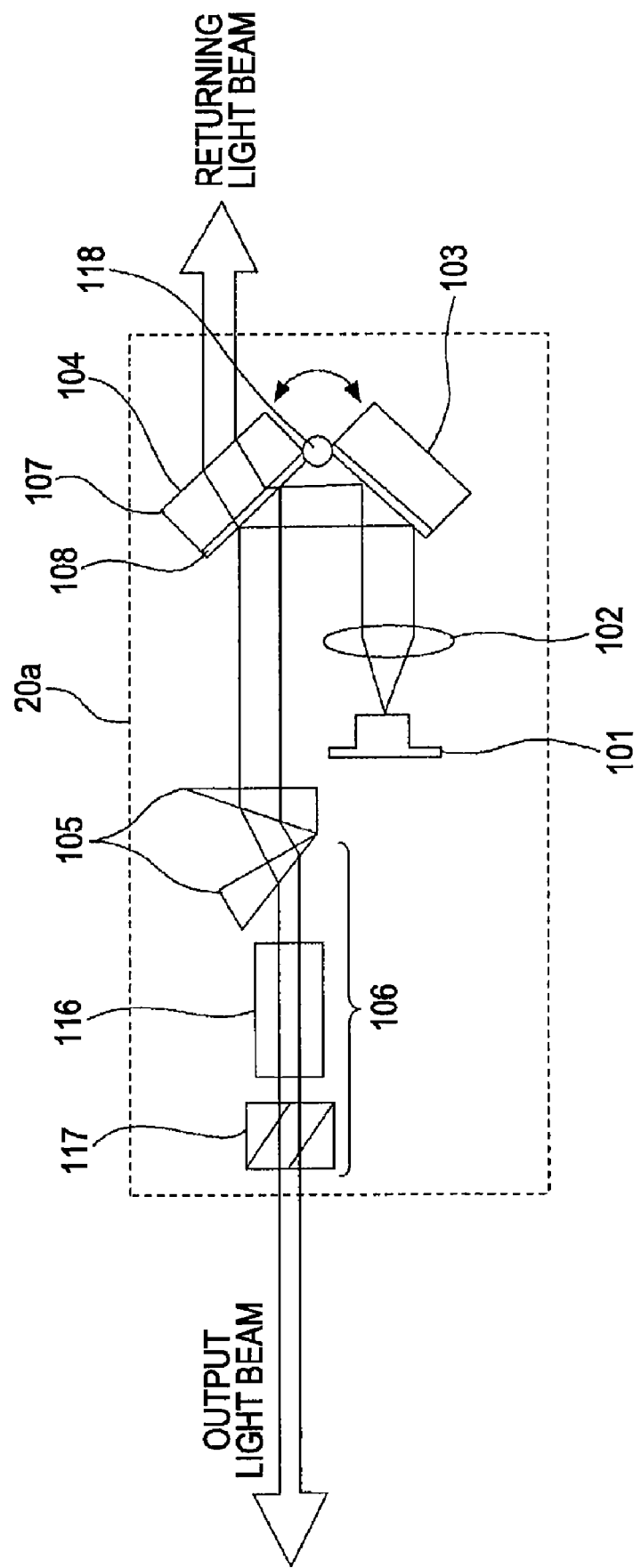
FIG. 12 illustrates an example of a laser light source that emits a tunable-wavelength laser light beam.

FIG. 12 illustrates an example of the laser light source 20a that emits a tunable-wavelength laser light beam. The laser light source 20a includes optical components, such as a laser diode 101, a collimating lens 102, a diffraction grating 103, a polarizing beam splitter 104, an anamorphic prism 105, and an isolator 106.

The laser diode 101 emits a laser light beam of a multiple mode. For example, the laser diode 101 emits a blue laser light beam having a wavelength of about 410 nm. The collimating lens 102 transforms the laser light beam emitted from the laser diode 101 into a parallel laser light beam. The diffraction grating 103 generates first-order light beams propagating in directions that are different depending on the wavelength. The angle between the diffraction grating 103 and the laser diode 101 is determined so that the first-order light beam having a predetermined wavelength (e.g., 410 nm) among the generated first-order light beams is returned to the laser diode 101. Thus, only a component of this wavelength increases in the laser diode 101, and therefore, the oscillating mode of the laser diode 101 is close to being a single mode.

Most of the laser light beam emitted from the laser diode 101 is a zeroth-order light beam, not a first-order light beam. Therefore, the laser light beam is reflected by the diffraction grating 103, like a mirror. The laser light source 20a is basically a Littrow external cavity laser. However, the laser light source 20a includes the polarizing beam splitter 104. The laser light source 20a can rotate about a rotation axis 118 while maintaining the relative locations of the diffraction grating 103 and the polarizing beam splitter 104 unchanged. According to the structure in which the diffraction grating 103 and the polarizing beam splitter 104 can rotate about the rotation axis 118, the laser light source 20a can change the wavelength of the output beam thereof while maintaining the propagation direction of the output beam used for recording and reconstructing a hologram to be constant regardless of the rotation angle.

The polarizing beam splitter 104 is formed by forming a polarizing film 108 on a surface of a transparent glass 107. The polarizing beam splitter 104 reflects the zeroth order beam reflected by the diffraction grating 103 in a predetermined direction other than the direction towards the diffraction grating 103, whereas the polarizing beam splitter 104 allows a beam having a polarizing direction rotated 90° from the polarizing direction of the zeroth order beam to pass therethrough. Note that, in FIG. 12, this light beam is referred to as a "returning light beam". The anamorphic prism 105 reshapes the cross section of the light beam into a predetermined shape. The isolator 106 includes a rotator 116 and a polarizing beam splitter 117 to prevent an external laser beam (reflected beam) ftom entering inside the laser light source 20a.

In the laser light source 20a having such a structure, the diffraction grating 103 and the polarizing beam splitter 104 are rotated about the rotation axis 118. In this way, the laser light source 20a can change the wavelength of a blue laser light beam of about 410 nm by 5 to 10 nm. It should be noted that the tunable-wavelength laser light source is not limited to the above-described tunable-wavelength laser light source. The tunable-wavelength laser light source may be of one of the other various types. For example, the tunable-wavelength laser light source may be a Littrow external cavity laser that outputs a first-order light beam.

Here, the returning light beam shown in FIG. 12 is part of the zeroth-order light beam. The returning light beam is detected by a photodetector (not shown). Subsequently, the wavelength of the zeroth-order light beam is detected. The control unit 60 outputs a signal for driving a motor (not shown) that rotates the diffraction grating 103 and the polarizing beam splitter 104 on the basis of the detected wavelength. Thus, a desired laser wavelength can be obtained.

A method for compensating for the recording and reconstruction characteristics by changing the wavelength of the laser beam and a method for compensating for the recording and reconstruction characteristics by changing the incident angle of the reference light beam, which are key features of the present embodiment, are described below. Before starting the description, a relationship between the shape of a hologram formed by the coaxial method and the temperature is described first.

In the coaxial method, the reference light beam and the signal light beam for forming a hologram are coaxially aligned and are made incident on the holographic recording medium 50. A light beam including the reference light beam and the signal light beam is collected and focused on the reflecting film 50b. The recording layer 50a has a thickness so that the depth of focus is not negligible. Therefore, the light beam that is made incident on the recording layer 50a is collected by the objective lens 24. A hologram is formed so that the center of the hologram is substantially coincident with the light axis of the objective lens 24 in accordance with the state of collecting the light beam. In addition, the hologram is formed so that, when the hologram is cut by a plane perpendicular to the light axis, the dimensions of the cross section of the hologram increase towards the incident direction of the light beam (i.e., towards the objective lens 24). That is, the hologram is formed so as to have a substantially cone shape having the center line (cone axis) coincident with the light axis. Accordingly, small portions of the hologram formed by a variety of light beams have a distribution of the reflectance ratio or the index of refraction that is symmetric with respect to the cone axis. Hereinafter, the cone axis of the cone-shaped hologram is referred to as a "center axis of the hologram".

Thus, a hologram having such a shape is formed in the recording layer 50a. When the temperature of the recording layer 50a changes, the recording layer 50a expands or contracts. The absolute amount of expansion or contraction of the portion of the recording layer 50a in the vicinity of the center axis is small whereas that far from the center axis is large. Accordingly, in both cases of compensating for the wavelength by changing the wavelength of the light beam or compensating for the angle by changing the incident angle of the reference light beam, which are described later, such particularity of the shape of the hologram should be taken into account. In contrast, according to the two-light beam method, the reference light beam and the signal light beam propagate in different light paths and are independently made incident on the holographic recording medium 50 at different angles. Therefore, small portions of the hologram do not have a distribution of the reflectance ratio or the index of refraction that is symmetric with respect to the cone axis.

Method in which Wavelength of Light Beam is Changed

In the hologram recording and reconstruction apparatus 100, by changing the wavelength of the recording and reconstruction light beam, the recording and reconstruction characteristics can be improved. In the coaxial method, since a hologram has the above-described small portion in which the distribution of the reflectance ratio or the index of refraction is symmetric with respect to the cone axis, the compensation by changing the wavelength of the light beam is uniformly performed (i.e., a change in the wavelength acts on every angle of a hologram). Therefore, the technique for improving the recording and reconstruction characteristics by the wavelength compensation is suitably applied to the coaxial method.

Here, the laser light source 20a shown in FIG. 6 can change the wavelength of a light beam, as described above. At that time, by changing the wavelength of a light beam in accordance with the difference between the temperatures of the holographic recording medium 50 at a recording time and at a reconstruction time, the recording and reconstruction characteristics can be improved. A method in which only the wavelength of a light beam is changed is described in more detail next.

The wavelength compensation at a reconstruction time is described first. The control unit 60 of the hologram recording and reconstruction apparatus 100 causes the hologram recording and reconstruction apparatus 100 to serve as a hologram reconstruction apparatus. The control unit 60 acquires the temperature at a recording time from header information.

Thereafter, the control unit 60 reads the temperature of the holographic recording medium 50 at the present time from the temperature sensor 51 and, subsequently, computes the difference between the temperature at a recording time read from the header information and the temperature acquired from the temperature sensor 51. The control unit 60 then acquires a predetermined wavelength corresponding to this difference from a table contained in a storage unit of the control unit 60 so as to output a control signal to the laser light source 20a. Thus, the wavelength of the light beam 13 is set to the predetermined wavelength.

At that time, in the objective lens 24, aberrations occur since the wavelength of the recording and reconstruction light beam varies. As a result, the reconstruction image on the image sensor 25 blurs. However, various experiments indicate that this blur can be reduced by changing the distance between the objective lens 24 and the image sensor 25. Accordingly, the position of the image sensor 25 at which the blur of the reconstruction image on the image sensor 25 is minimal for each of the wavelengths is prestored in the storage unit of the control unit 60. As the wavelength of the light beam is changed, the position of the image sensor 25 is changed using these positions. Note that the control of the wavelength of the light beam and the position of the image sensor 25 may be performed at a recording time. Alternatively, the control of the wavelength of the light beam and the position of the image sensor 25 may be performed at a recording time and at a reconstruction time.

In an alternative method for removing the blur of the reconstruction image on the image sensor 25 caused by the change in the wavelength of the recording and reconstruction light beam, the control unit 60 outputs a control signal to control the distance between the relay lenses 38 and 39 of the second relay lens system, which is disposed between the objective lens 24 and the spatial light modulator 22. Like the above-described method, the position of the relay lens 39 at which the blur of the reconstruction image on the image sensor 25 is minimal for each of the wavelengths is prestored in the storage unit of the control unit 60.

Adjustment of Incident Angle of Reference Light Beam

Adjustment of the incident angle of the reference light beam is now herein described. This adjustment is another key feature of the hologram recording and reconstruction apparatus 100 according to the present embodiment. In the hologram recording and reconstruction apparatus 100 using a coaxial optical system, reference light beams are incident on a hologram recording medium at a variety of angles so as to surround a signal light beam. To adjust the incident angles of the reference light beams and improve the recording and reconstruction characteristics, the incident angles needs to be corrected to angles of different absolute values in accordance with the incident angles of the reference light beams made incident on the holographic recording medium. That is, as mentioned earlier, since the hologram is formed in a cone shape having the center axis that is coincident with the light axis of the objective lens 24, the angle correction value for the portion in the vicinity of the center axis needs to be small. In contrast, the angle correction value for the portion far from the center axis needs to be large. On the other hand, in the hologram recording and reconstruction apparatus 100 using a two-beam optical system, the recording and reconstruction characteristics can be improved by evenly changing the incident angles of the reference light beams made incident on a holographic recording medium. Continuing from the description of above-described characteristics, the description of adjustment of the incident angle of the reference light beam continues.

Typical methods for adjusting the incident angle are: a method in which the display of a reference light beam pattern is enlarged or reduced, a method in which the position of an objective lens is changed, and a method in which the position of a relay lens is changed. However, any two of these three methods may be combined. These three methods are sequentially described next. In any one of these methods, a reference light beam entering from the far side of the light axis of the objective lens 24 has an absolute angle correction value larger than that for a reference light beam entering from the near side of the light axis of the objective lens 24. Thus, the method is suitable for performing the angle compensation of a hologram recorded using the coaxial optical system.

Method in which Display of Reference Light Beam Pattern is Enlarged or Reduced

By enlarging or reducing the display of a reference light beam pattern, that is, the reference light beam sub-area 47, the numerical aperture (NA) of the reference light beam incident on the holographic recording medium 50 from the objective lens 24 can be made variable. In this way, by changing the incident angle $\theta_R$, the effect of the change in temperature of the holographic recording medium 50 on the recording and reconstruction characteristics is compensated for, and therefore, an excellent recording and reconstruction characteristics can be obtained.

That is, since the objective lens 24 is a convex lens that converges the parallel light beams on one point on the light axis, the objective lens 24 has different NAs for the outermost light beam to the innermost beam. The NA increases towards the outermost portion of the objective lens 24. As a result, the reference light beam in the more outer portion has a larger incident angle $\theta_R$. Accordingly, by moving the reference light beam to the outer portion, the incident angle $\theta_R$ of the reference light beam can be increased. In contrast, by moving the reference light beam to the inner portion, the incident angle $\theta_R$ of the reference light beam can be decreased.

Figure 13:
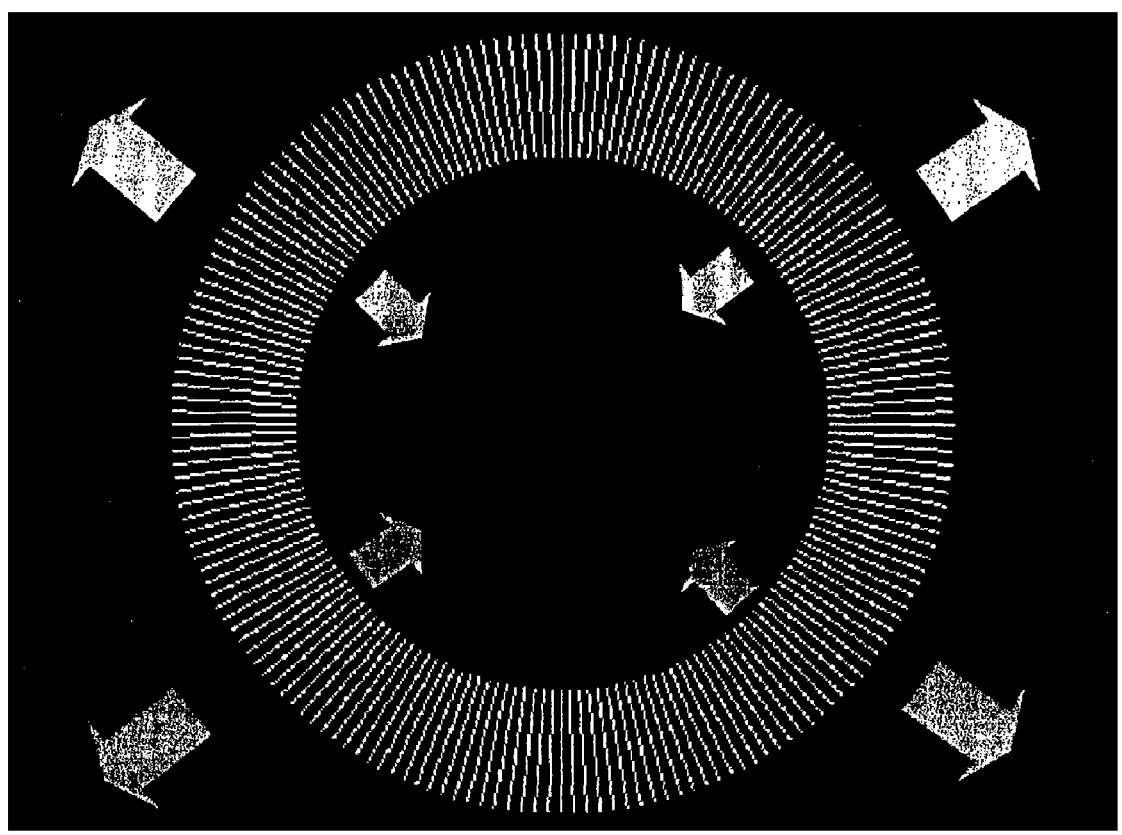
FIG. 13 illustrates an example pattern of a reference light beam sub-area displayed on the spatial light modulator.

FIG. 13 illustrates an example pattern of the reference light beam sub-area 47 displayed on the spatial light modulator 22. When the temperature at a reconstruction time falls from that at a recording time, the pattern of the reference light beam sub-area 47 is moved in directions indicated by large white arrows in FIG. 13. That is, the pattern of the reference light beam sub-area 47 is enlarged into a similar shape while the center point of the spatial light modulator 22 (i.e., the geometric center of the concentric pattern of the reference light beam sub-area 47) remains fixed so that the shape of the pattern of the reference light beam sub-area 47 remains unchanged. This enlarged shape is displayed on the spatial light modulator 22.

In contrast, when the temperature at a reconstruction time rises from that at a recording time, the pattern of the reference light beam sub-area 47 is moved in directions indicated by small white arrows in FIG. 13. That is, the pattern of the reference light beam sub-area 47 is reduced into a similar shape while keeping the center point of the spatial light modulator 22 fixed so that the shape of the pattern of the reference light beam sub-area 47 remains unchanged. This reduced shape is displayed on the spatial light modulator 22.

As noted above, by enlarging or reducing the pattern of the reference light beam sub-area 47, the position of the reference light beam made incident on the objective lens 24 is changed to the outer peripheral portion or to the inner portion of the objective lens 24. Thus, the reference light beam NA can be changed. That is, as the light beam passes through a more outer portion of the objective lens 24, the NA value (the incident angle $\theta_R$) increases. In contrast, as the light beam passes through a more inner portion of the objective lens 24, the NA value (the incident angle $\theta_R$) decreases. Therefore, when the pattern of the reference light beam sub-area 47 is enlarged, all the reference light beams move to the outer side. Thus, the incident angles $\theta_R$ of all the reference light beams are corrected so as to be increased.

In contrast, when the pattern of the reference light beam sub-area 47 is reduced, all the reference light beams move to the inner side. Thus, the incident angles $\theta_R$ of all the reference light beams are corrected so as to be decreased. In this way, by enlarging or reducing the pattern of the reference light beam sub-area 47, the incident angle $\theta_R$ of the reference light beam can be increased or decreased.

Here, as the resolution of the pattern displayed on the spatial light modulator 22 is higher, that is, as the pixel pitch is smaller (the pattern of the reference light beam sub-area 47 can be changed more precisely), the pattern of the reference light beam sub-area 47 can be enlarged or reduced in a smaller step. The data used for displaying the pattern of the reference light beam sub-area 47 is prestored in a storage circuit, such as a read only memory (ROM), in the control unit 60. The data in accordance with the enlargement or the reduction of the pattern of the reference light beam sub-area 47 is delivered from the control unit 60 to the spatial light modulator 22.

The details of the signal used for the enlargement or the reduction of the pattern of the reference light beam sub-area 47 will be described later after description of the other two methods.

Method in which Position of Objective Lens is Changed

In addition to the above-described method, by changing the distance between the objective lens 24 and the surface of the holographic recording medium 50 facing the objective lens 24, that is, the distance between the objective lens 24 and the holographic recording medium 50 in the focusing direction, the incident angle $\theta_R$ of the reference light beam can be changed. That is, when the distance between the objective lens 24 and the holographic recording medium 50 is increased, a predetermined small area is irradiated with the light beam from a more outer periphery of the objective lens 24. This means a larger incident angle $\theta_R$. In contrast, when the distance between the objective lens 24 and the holographic recording medium 50 is decreased, the predetermined small area is irradiated with the light beam from a more inner periphery of the objective lens 24. This means a smaller incident angle $\theta_R$.

Here, to change the distance between the objective lens 24 and the surface of the holographic recording medium 50, the objective lens 24 on which parallel light beams are made incident may be moved in a direction indicated by an arrow F in FIG. 5, by the objective lens actuator 54 so that the position of the objective lens 24 relative to the disk-shaped surface of the holographic recording medium 50 is changed. Alternatively, the whole holographic recording medium 50 may be moved together with a spindle motor (not shown) towards the lens surface of the objective lens 24. In the present embodiment, the objective lens 24, the reflecting mirror 56, the dichroic mirror 34, the servo optical system 30, the control unit 60, and the objective lens actuator 54 form an exemplary focus control mechanism.

In general, the focus servo system operates so that the focal point of the recording and reconstruction beam is fixed at a predetermined point at all times. A target value of the focus servo system is a value corresponding to the defocus value. The target value is set by the control unit 60. In this case, the angle correction performed at a reconstruction time effects on not only the reference light beam but also the diffracted light beam. In addition, if the angle correction is performed at a recording time (described below), not only the incident angle of the reference light but also the incident angle of the signal light beam changes at the same time.

As noted above, by changing the distance between the objective lens 24 and the surface of the holographic recording medium 50, at least the incident angle $\theta_R$ can be changed, and therefore, excellent recording and reconstruction characteristics can be achieved. However, the focal point is shifted from that determined at a recording time in advance, that is, so-called defocusing on a holographic recording medium (hereinafter referred to as "defocusing on a recording medium") occurs. Consequently, the resolution of an image generated on the image sensor 25 with the reconstruction light beam is decreased. That is, a blurry image is generated. To achieve excellent recording and reconstruction characteristics, the following process is performed so that blurring of the image (hereinafter referred to as "defocusing of a reconstruction image") caused by moving the objective lens 24 or the holographic recording medium 50 in the focusing direction is corrected and defocusing of a reconstruction image does not occur.

In a first processing method, in addition to the objective lens 24 being moved, the relay lens 39 of the second relay lens system is moved in a direction indicated by an arrow R. If the relay lens 39 is moved, a light beam propagating from the reflecting mirror 56 towards the objective lens 24 is made incident on the objective lens 24 at an angle slightly shifted from the parallel light beam. As a result, the light beam is reflected by the recording layer 50a of the holographic recording medium 50. The reflected light beam passes through the second relay lens system again. When this returning light beam from the relay lens 38 passes through the beam splitter 23, the returning light beam is not a parallel light beam. Accordingly, an image (a reconstruction image) generated on the image sensor 25 by the reconstruction light beam and a diffraction light beam can be properly focused by setting an appropriate moving amount of the relay lens 39 to remove the defocus of the reconstruction image. That is, the defocus of the reconstruction image caused by the defocus on the recording medium is canceled out by changing the position of the relay lens 39. In this method, a relationship between the amount of defocus of the focus servo and the moving amount of the relay lens 39 is prestored in the form of a table in the storage unit of the control unit 60. Therefore, the moving amount of the relay lens 39 corresponding to the amount of defocus of the focus servo can be easily acquired.

In a second processing method, the image sensor 25 is moved in a direction indicated by an arrow I. By moving the image sensor 25, the light receiving surface of the image sensor 25 can be relocated in a plane on which the clear image moved by the defocus of the reconstruction image is formed. Thus, the image (reconstruction image) generated on the image sensor 25 with the reconstruction light beam is properly focused without defocusing. That is, the defocus of the reconstruction image caused by the defocus on the recording medium is canceled out by changing the position of the image sensor 25. In this method, a relationship between the amount of defocus of the focus servo and the moving amount of the image sensor 25 is prestored in the form of a table in the storage unit of the control unit 60. Therefore, the moving amount of the image sensor 25 corresponding to the amount of defocus of the focus servo can be easily acquired.

As shown by the cross section in FIG. 6, a hologram is formed in a fan-shaped distribution in the recording layer 50a. In the above-described method, a change in the shape of the hologram in accordance with a change in temperature is compensated for by moving the objective lens. This compensation is effective for a hologram formed by only transmissive components of the signal light beam and the reference light beam. For holograms formed by a signal light beam and a reference light beam reflected by the reflecting film 50b, the shape of the hologram is changed in a direction opposite to that for the holograms formed by transmissive components of the signal light beam and the reference light beam. Accordingly, for example, for a hologram recorded by using the same amounts of transmissive component and reflective component, the amount of the diffracted light beam is decreased to half the amount of the diffracted light from the hologram formed by only transmissive component of the signal light beam and the reference light beam. Similarly, if the defocusing is performed for a diffraction grating formed from only reflective components, no output is acquired from a diffraction grating formed from only transmissive components. Therefore, in the method in which an objective lens is moved, the amount of compensation is determined by taking into account the amounts of the transmissive component and the reflective component.

Method in which Position of Relay Lens is Changed

Figure 14:
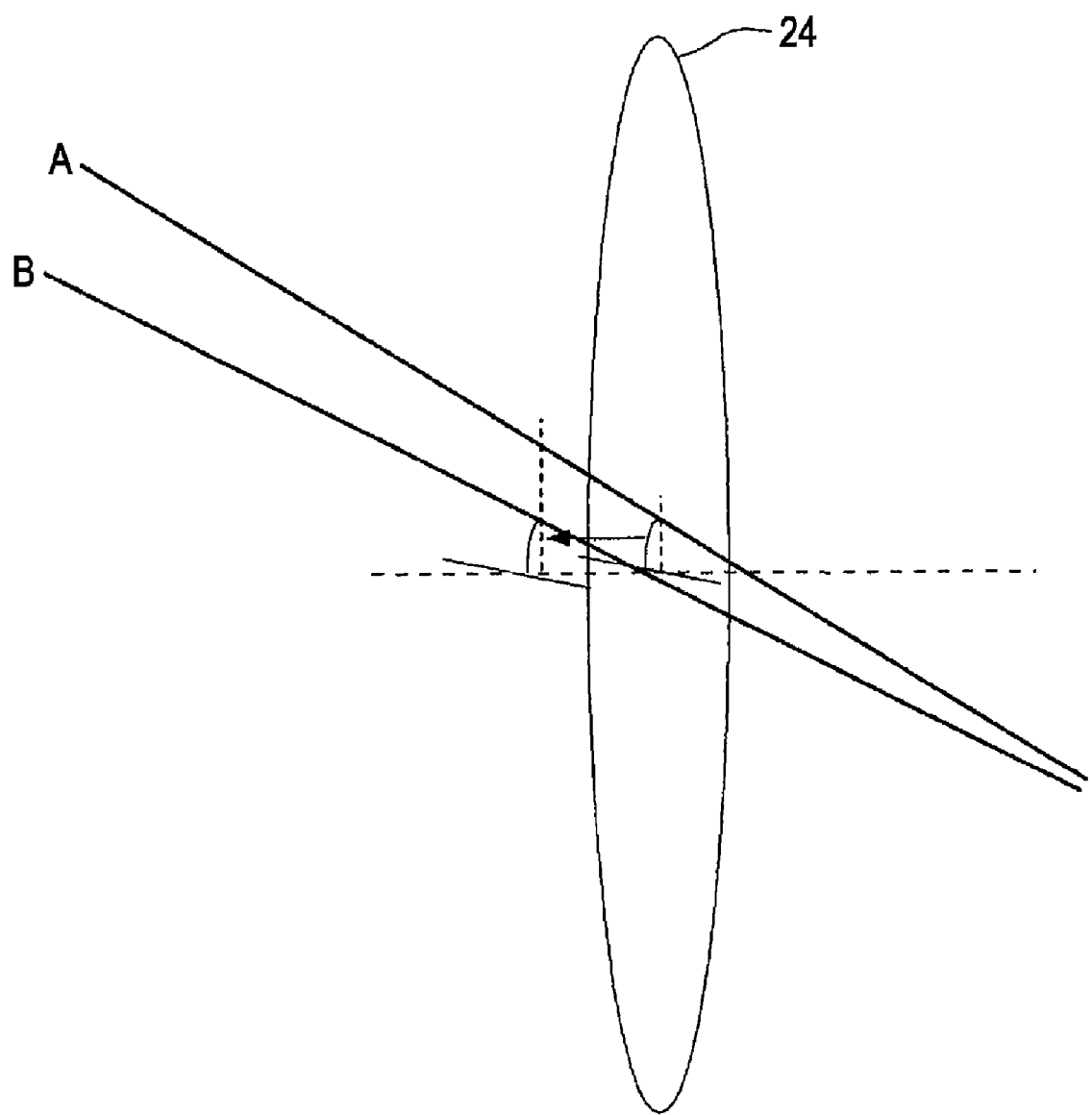
FIG. 14 illustrates a light beam made incident on an objective lens.

As shown in FIG. 14, by changing the incident position of each of the light beams incident on the objective lens 24, the light beams propagating from the second relay lens system are changed to a converging light beam or a diverging light beam. Thus, the size of the recording pattern image at the imaging point 57 is changed. That is, if a light beam A shown in FIG. 14 is moved to the position indicated by a light beam B, the incident angle of the light beam made incident on a holographic recording medium is changed.

That is, by changing the distance between the relay lens 38 and 39 in the second relay lens system disposed in the hologram recording and reconstruction apparatus 100 shown in FIG. 5, a light beam made incident on the objective lens 24 can be converged or diverged. As a result, the incident position of the light beam made incident on the objective lens 24 can be changed, for example, from the position indicated by the light beam A to the position indicated by the light beam B. In the present embodiment, the relay lens actuator 59 including the above-described position sensor moves the relay lens 39. In such a case, the angle correction performed at a reconstruction time effects on not only the reference light beam but also the diffracted light beam. In addition, if the angle correction is performed at a recording time (described below), not only the incident angle of the reference light but also the incident angle of the signal light beam change at the same time.

Particular Control Techniques in Three Methods

Particular control techniques in the above-described method in which the display of a reference light beam pattern is enlarged or reduced, method in which the position of an objective lens is changed, and method in which the position of a relay lens is changed are described next. In each method, the following techniques are available:

(a) A technique of performing the angle compensation at a reconstruction time, (b) A technique of performing the angle compensation and the wavelength compensation at a reconstruction time, (c) A technique of performing the angle compensation at a recording time, (d) A technique of performing the angle compensation and the wavelength compensation at a recording time, (e) A technique of performing the angle compensation at a reconstruction time and a recording time, and (f) A technique of performing the angle compensation and the wavelength compensation at a reconstruction time and a recording time.

(Technique of Performing Angle Compensation at Reconstruction Time)

The control unit 60 of the hologram recording and reconstruction apparatus 100 causes the hologram recording and reconstruction apparatus 100 to serve as a holographic reconstruction apparatus. The control unit 60 acquires the temperature recorded as header information at a recording time. Here, for example, the header information is recorded in a low density so that the hologram recording and reconstruction apparatus 100 can easily read the header information even when the temperature at a reconstruction time is significantly different from that at a recording time. This header information is included in each of recording data blocks that are sequentially written in a short period of time while the temperature of the holographic recording medium 50 is substantially constant. In addition, the header area of the holographic recording medium 50 may include the coefficient of thermal expansion of the recording layer of the holographic recording medium 50 in the form of a preformatted address groove 50c or preformatted hologram information. In this way, information about the angle compensation may be acquired on the basis of a formula prestored in the control unit 60 without using the table in the storage unit of the control unit 60.

Subsequently, the control unit 60 reads the temperature of the holographic recording medium 50 at the present time from the temperature sensor 51 and computes the difference between the temperature at a recording time read from the header information and the temperature from the temperature sensor 51. When the method in which the display of a reference light pattern is enlarged or reduced is employed, the control unit 60 reads the table in the storage unit of the control unit 60 and sends an image having the pattern of the reference light beam sub-area 47 corresponding to the temperature difference to the spatial light modulator 22.

When the method in which the position of an objective lens is changed is employed, the control unit 60 determines a value corresponding to an amount of defocusing on the basis of the difference between the temperatures at a recording time and at a reconstruction time. Thereafter, the control unit 60 determines the moving amount of the relay lens 39 corresponding to the amount of defocusing (the first processing method) or corresponding to the amount of defocusing and the moving amount of the image sensor 25 (the second processing method). The control unit 60 makes these determinations by referencing the table in the storage unit thereof.

When the method in which the position of a relay lens is changed is employed, the control unit 60 references the table in the storage unit thereof to send a control signal corresponding to the difference between the temperatures at a recording time and at a reconstruction time to the relay lens actuator 59.

(Technique of Performing Angle Compensation and Wavelength Compensation at Reconstruction Time)

In each of the method in which the display of a reference light pattern is enlarged or reduced, the method in which the position of an objective lens is changed, and the method in which the position of a relay lens is changed, if the temperature at the reconstruction time rises from that at the recording time, the control unit 60 decreases the wavelength of the recording and reconstruction light beam 13. In contrast, if the temperature at the reconstruction time falls from that at the recording time, the control unit 60 increases the wavelength of the recording and reconstruction light beam 13. The amounts of the wavelength shift are prestored in a table in the storage unit. The control unit 60 sends a control signal to the laser light source 20a, which controls a motor (not shown). In this way, the wavelength of the light beam 13 is changed to a predetermined value. When the angle compensation and the wavelength compensation of the light beam 13 are performed, the area of the hologram that can be reconstructed at one time is significantly increased, compared with the case where only the angle compensation is performed.

Accordingly, for example, if the difference between the temperatures at a recording time and at a reconstruction time is relatively small, the angle compensation is performed at the reconstruction time. In contrast, if the difference between the temperatures at a recording time and at a reconstruction time is relatively large, the angle compensation and the wavelength compensation are performed at the reconstruction time. In this way, a good balance between the reconstruction speed (transfer rate) and the quality of the reconstruction signal can be achieved. That is, when the difference between the temperatures at a recording time and at a reconstruction time is relatively small, the recorded data in a page can be read out in one scan by performing only the angle compensation. In contrast, when the difference between the temperatures at a recording time and at a reconstruction time is relatively large, the recorded data in a page can be read out in one scan by performing the angle compensation and the wavelength compensation. Thus, the transfer rate of the hologram recording and reconstruction apparatus 100 can be increased.

(Technique of Performing Compensation at Recording Time)

So far, the technique of performing the angle compensation or both the angle compensation and the wavelength compensation at a reconstruction time has been described. However, if the temperature of the holographic recording medium 50 can be managed at a reconstruction time or if the angle compensation or both the angle compensation and the wavelength compensation can be performed at a reconstruction time in accordance with the temperature of the holographic recording medium 50 at the reconstruction time, the angle compensation or both the angle compensation and the wavelength compensation can be performed at a recording time. In this way, the temperature of the holographic recording medium 50 at a recording time need not be stored as the header information.

In such a case, the control unit 60 reads the current temperature of the holographic recording medium 50 from the temperature sensor 51. In the case of the method in which the display of a reference light pattern is enlarged or reduced, the control unit 60 sends an image having the pattern of the reference light beam sub-area 47 corresponding to the temperature difference to the spatial light modulator 22. In contrast, in the case of the method in which the position of an objective lens is changed, the control unit 60 determines the amount of defocusing on a recording medium corresponding to the temperature. In the case of the method in which the position of a relay lens is changed, the control unit 60 sends a control signal corresponding to the temperature to the relay lens actuator 59.

It should be understood by those skilled in the art that various modifications, combinations, sub-combinations and alterations may occur depending on design requirements and other factors insofar as they are within the scope of the appended claims or the equivalents thereof.

For example, the angle compensation can be freely combined with the wavelength compensation. For example, when the difference between the temperatures at a recording time and at a reconstruction time is relatively small, either the angle compensation or the wavelength compensation may be performed. In contrast, when the difference between the temperatures at a recording time and at a reconstruction time is relatively large, both the angle compensation and the wavelength compensation are performed. In addition, the method in which the display of a reference light pattern is enlarged or reduced can be combined with the method in which the position of an objective lens is changed. Furthermore, when the wavelength compensation is performed, a hologram in the same area may be reconstructed a plurality of times each by changing the wavelength (multiple scans) so as to achieve excellent reconstruction performance. Furthermore, by using one of the method in which the display of a reference light pattern is enlarged or reduced, the method in which the position of an objective lens is changed, and the method in which the position of a relay lens is changed or by using the combination thereof, a hologram in the same area may be reconstructed a plurality of times each by changing the incident angle of the reference light beam (multiple scans) so as to achieve excellent reconstruction performance. Also, any combination of the above-described methods is possible. For example, the angle compensation can be performed at a reconstruction time and the wavelength compensation can be performed at a recording time.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A hologram recording and reconstruction apparatus for recording a hologram in a recording layer of a holographic recording medium by causing a signal light beam modulated in accordance with data to be recorded to interfere with a reference light beam, the signal light beam and the reference light beam being emitted from the same light source, the hologram recording and reconstruction apparatus reconstructing the recorded data from a diffracted light beam generated by emitting the reference light beam onto the recording layer, the hologram recording and reconstruction apparatus comprising:
   a spatial light modulator on which a reference light beam pattern for generating the reference light beam is displayed;
   an objective lens for allowing the signal light beam, the reference light beam, and the diffracted light beam to pass therethrough;
   focus controlling means for maintaining a predetermined distance between the objective lens and the recording layer;
   a temperature sensor for detecting the temperature of the holographic recording medium; and
   a control unit for controlling the distance between the objective lens and the recording layer in accordance with the temperature detected by the temperature sensor, wherein when reconstructing the recorded data, the control unit controls the distance between the objective lens and the recording apparatus based on a difference between the temperature detected by the temperature sensor and a temperature of the holographic recording medium at a recording time.

2. The hologram recording and reconstruction apparatus according to claim 1, further comprising:
   a relay lens system including two lenses disposed between the objective lens and the spatial light modulator;
   wherein the distance between the two lenses is changed in accordance with the distance between the objective lens and the recording layer.

3. The hologram recording and reconstruction apparatus according to claim 1, further comprising:
   a relay lens system including two lenses disposed between the objective lens and the spatial light modulator; and
   an image sensor for detecting a reconstruction image generated by the diffracted light beam;
   wherein the distance between the image sensor and the objective lens is changed in accordance with the distance between the objective lens and the recording layer.

4. The hologram recording and reconstruction apparatus according to claim 1, wherein the control unit obtains the temperature of the holographic recording medium at the recording time from header information recorded in the holographic recording medium.

5. A hologram recording and reconstruction apparatus for recording a hologram in a recording layer of a holographic recording medium by causing a signal light beam modulated in accordance with data to be recorded to interfere with a reference light beam, the signal light beam and the reference light beam being emitted from the same light source, the hologram recording and reconstruction apparatus reconstructing the recorded data from a diffracted light beam generate by emitting the reference light beam onto the recording layer, the hologram recording and reconstruction apparatus comprising:
   an objective lens for allowing the signal light beam, the reference light beam, and the diffracted light beam to pass therethrough;
   a spatial light modulator on which a reference light beam pattern for generating the reference light beam is displayed;
   a relay lens system including two lenses disposed between the objective lens and the spatial light modulator;
   a temperature sensor for detecting the temperature of the holographic recording medium; and
   a control unit for controlling the distance between the two lenses in accordance with the temperature detected by the temperature sensor, wherein when reconstructing the recorded data, the control unit controls the distance between the two lenses; based on a difference between the temperature detected by the temperature sensor and a temperature of the holographic recording medium at a recording time.

6. A hologram recording and reconstruction apparatus for recording a hologram in a recording layer of a holographic recording medium by causing a signal light beam modulated in accordance with data to be recorded to interfere with a reference light beam, the signal light beam and the reference light beam being emitted from the same light source, the hologram recording and reconstruction apparatus reconstructing the recorded data from a diffracted light beam generated by emitting the reference light beam onto the recording layer, the hologram recording and reconstruction apparatus comprising:
   a spatial light modulator on which a reference light beam pattern for generating the reference light beam is displayed;
   an objective lens configured to allow the signal light beam, the reference light beam, and the diffracted light beam to pass therethrough;
   a focus controlling unit configured to maintain a predetermined distance between the objective lens and the recording layer;
   a temperature sensor configured to detect the temperature of the holographic recording medium; and
   a control unit configured to control the distance between the objective lens and the recording layer in accordance with the temperature detected by the temperature sensor, wherein when reconstructing the recorded data, the control unit controls the distance between the objective lens and the recording apparatus based on a difference between the temperature detected by the temperature sensor and a temperature of the holographic recording medium at a recording time.

* * * * *